United States Patent
Inada (10) Patent No.: US 6,452,147 B1
(45) Date of Patent: *Sep. 17, 2002

(54) IMAGE FORMING APPARATUS WHICH CORRECTS IMAGE FORMING POSITIONS USING TONER PATTERNS, AND ADJUSTING METHOD USED IN TONER PATTERN DETECTING MECHANISM PROVIDED IN THE IMAGE FORMING APPARATUS

(75) Inventor: Yasuyuki Inada, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,937

(22) Filed: Jan. 20, 1999

(30) Foreign Application Priority Data

Jan. 21, 1998 (JP) .......................................... 10-009426

(51) Int. Cl.[7] .............................................. H01L 27/00
(52) U.S. Cl. .............................. 250/208.1; 250/559.29; 399/394
(58) Field of Search ......................... 250/208.1, 559.44, 250/559.4, 548, 559.29; 399/394, 301, 49, 66; 347/116, 115; 355/53, 54, 57

(56) References Cited

U.S. PATENT DOCUMENTS

| | | | |
|---|---|---|---|
| 5,809,380 A | * | 9/1998 | Katakabe et al. ............ 399/223 |
| 5,854,958 A | | 12/1998 | Tanimoto et al. ............. 399/49 |

* cited by examiner

*Primary Examiner*—Que T. Le
(74) *Attorney, Agent, or Firm*—McDermott, Will & Emery (57) ABSTRACT

An image forming apparatus has a function for correcting a condition for an image formation in accordance with a detection result given by a detecting unit which detects a toner pattern formed on a transfer medium by an image holding component. A deviation obtaining unit obtains a deviation in the main scanning direction between a detecting position on the transfer medium and a predetermined point of the toner pattern to be formed on the transfer medium, the detecting position being a position where the detecting unit detects the toner pattern. An adjusting unit adjusts, in accordance with the deviation obtained by the deviation obtaining unit, a positional relation in the main scanning direction between the detecting position and the predetermined point to reduce the deviation.

12 Claims, 12 Drawing Sheets

IMAGE FORMING APPARATUS WHICH CORRECTS IMAGE FORMING POSITIONS USING TONER PATTERNS, AND ADJUSTING METHOD USED IN TONER PATTERN DETECTING MECHANISM PROVIDED IN THE IMAGE FORMING APPARATUS

This application is based on an application No. 10-9426 filed in Japan, the content of which is hereby incorporated by reference.

BACKGROUND OF THE INVENTION (1) Field of the Invention

The present invention relates to an image forming apparatus which forms toner patterns and detects them using a sensor to correct image forming positions in accordance with detection results, and particularly relates to an adjustment to a toner pattern detecting mechanism provided in the image forming apparatus.

(2) Description of the Related Art

A so-called "tandem-type" image forming apparatus, as one example of a conventional full-color image forming apparatus, has image holding components (photosensitive drums, for example) set in line corresponding to reproduction colors cyan, magenta, yellow, and black. The reproduction colors are respectively referred to as C, M, Y, and K hereinafter and components related to these colors are assigned numerals with a corresponding C, M, Y, or K. Toner images for different colors formed on the image holding components are sequentially transferred onto a transfer material (a recording sheet, for example) which is transported on a transfer belt or onto the transfer belt as a transfer intermediate component. The toner images are superimposed to form a color image.

In general, for the tandem-type image forming apparatus having the stated construction, a so-called "registration correction" is performed to correct forming positions of images formed on surfaces of the image holding components corresponding to the reproduction colors. By means of the registration correction, deterioration in the image quality caused by color deviations is prevented.

Figure 1A:
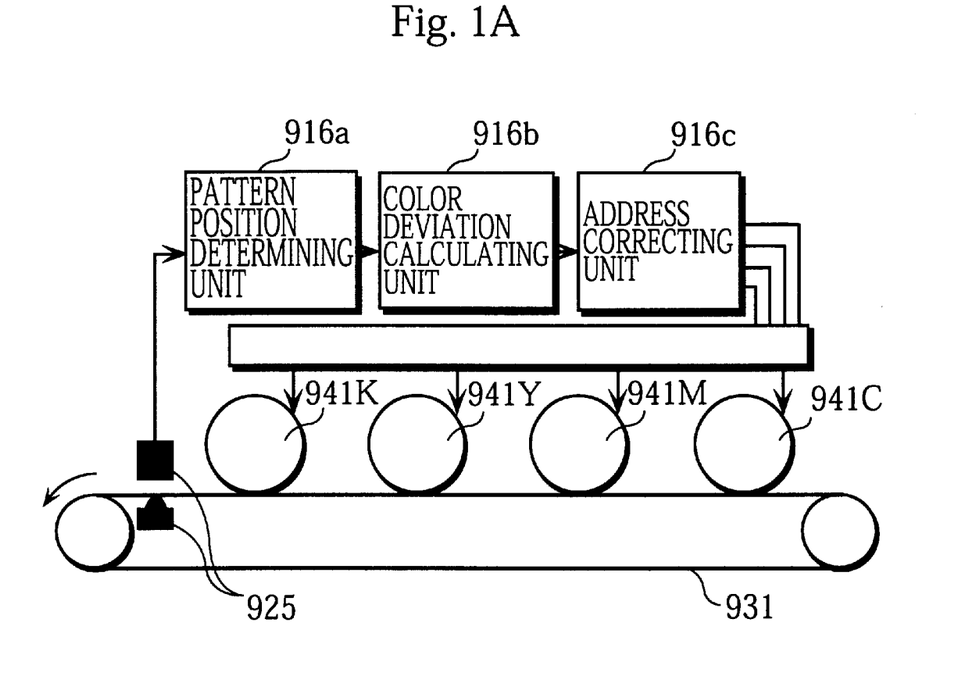
FIG. 1A is a diagrammatic illustration of a tandem-type image forming apparatus which has a registration correction mechanism.
Figure 1B:
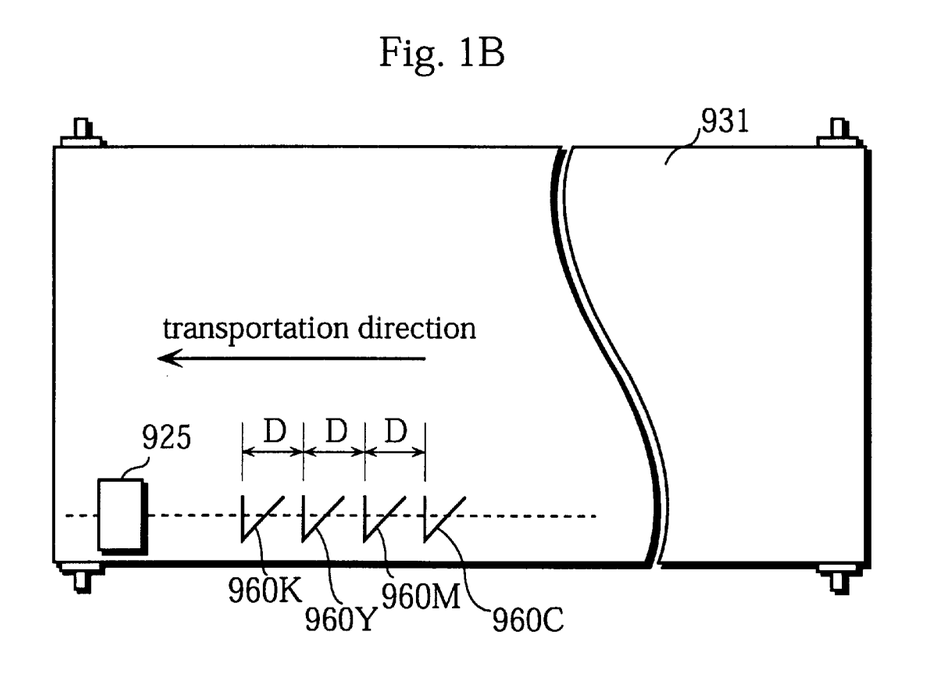
FIG. 1B is a plan view showing an example of registration marks formed on a transfer belt when the registration correction is performed.

The following is a brief description of a method of the registration correction, with reference to FIGS. 1A and 1B. FIG. 1A is a diagrammatic illustration of a tandem-type image forming apparatus which has a registration correction mechanism. For the registration correction performed in this image forming apparatus, an optical sensor 925 for optically detecting a toner density is set after photosensitive drums 941C to 941K in the transportation direction of a transfer material, as shown in FIG. 1A. The photosensitive drums 941C to 941K are set along a transfer belt 931. Registration marks 960C to 960K, for example, corresponding to the photosensitive drums 941C to 941K are formed on the transfer belt 931 as shown in FIG. 1B.

The registration marks 960C to 960K are formed in the same shape, and are V-shaped in FIG. 1B. Each of the V-shaped registration marks is composed of a standard line making a right angle with a transportation direction when no deviation is detected and a sloped line forming a 45° angle with the standard line. When image writing positions on the photosensitive drums 941C to 941K are correct and transfer positions are also correct, this means that no color deviations occur. In this case, the registration marks 960C to 960K are formed on the exactly same line that is parallel to the transportation direction as shown in FIG. 1B, with the standard lines being formed with a distance D between them in the transportation direction.

The optical sensor 925 set after the photosensitive drums 941C to 941K detects the registration marks 960C to 960K. Due to its detection characteristics, the optical sensor 925 detects a toner density of a point located directly under the optical sensor 925. More specifically, the optical sensor 925 sequentially detects toner densities of points on a dash line shown in FIG. 1B. Here, a high density value is detected at each point of intersection of the dash line and the standard line or the sloped line of the corresponding registration mark 960C to 960K.

If the registration marks 960C to 960K are formed on the transfer belt 931 at respective correct positions, a time period taken from the detection of the standard line to the detection of the next standard line is obtained by dividing the distance D by a moving speed of the transfer belt 931. In addition, time periods respectively taken from the detection of the standard line to the detection of the sloped line of the registration marks 960C to 960K are the same.

Meanwhile, if a timing at which a registration mark is formed is different between the photosensitive drums 941C to 941K, the distance D varies according to the different timings. This means that the time period taken from the detection of the standard line to the detection of the next standard line varies. In this case, an address of image data read from an image memory in the sub-scanning direction is corrected for each pixel so that deviations of the registration marks 960C to 960K are corrected.

If the image forming positions on the photosensitive drums 941C to 941K are deviated in the main scanning direction, the time period taken between the detections the standard line and the sloped line varies with the registration marks 960C to 960K. Since the standard line and the sloped line of each of the registration marks 960C to 960K intersect at a 45° angle, relative differences in time periods between the detections of the standard line and the sloped line correspond with deviations of the registration marks 960C to 960K in the main scanning direction. In this case, an address of image data read from the image memory in the main scanning direction is corrected for each pixel, with one of the registration marks 960C to 960K being set as a standard mark. As a result, the time periods respectively taken between the detections of the standard lines and the sloped lines of the registration marks 960C to 960K are the same.

The above operations are performed by a pattern position determining unit 916a, a color deviation calculating unit 916b, and an address correcting unit 916c shown in FIG. 1A. The pattern position determining unit 916a determines timings at which the registration marks 960C to 960K are respectively detected. The color deviation calculating unit 916b calculates the color deviations. In doing so, the color deviation calculating unit 916b obtains the color deviations in the main scanning direction from the relative differences in the time periods respectively taken between the detections of the standard lines and the sloped lines of the registration marks 960C to 960K, and obtains the color deviations in the sub-scanning direction from the relative differences in the time periods respectively taken between the detections of the standard line and the corresponding next standard line. The address correcting unit 916c corrects an address value for each pixel in accordance with the color deviations in the main scanning and sub-scanning directions.

Here, the optical sensor 925 should reliably detect the registration marks 960C to 960K so that the registration correction is correctly performed as stated above. In general, a registration mark has a width equal to or shorter than 8 mm in the main scanning direction. To obtain a valid detection value, about 4 mm middle short part of the 8 mm-wide registration mark needs to be detected. Meanwhile, since tolerances are established for an installation position of the optical sensor 925, a timing at which the optical sensor 925 detects the registration marks 960C to 960K varies according to the position of the optical sensor 925. Also, deviations of the image forming positions of the registration marks 960C to 960K and magnification deviations in the main scanning and sub-scanning directions may be initially great.

When the registration correction is performed, the optical sensor 925 may not be able to reliably detect the registration marks 960C to 960K due to the deviated installation position of the optical sensor 925 and the variations in the image forming positions of the registration marks 960C to 960K which have been determined before the registration correction is performed.

To avoid this problem, the registration mark can be formed in a large size. However, it is desirable to have a distance between the registration marks 960C to 960K as short as possible so that fluctuations in the moving speed of the transfer belt 931 does not adversely affect the formations of the registration marks 960C to 960K. Moreover, to improve accuracy of the registration correction, registration marks need to be formed as many as possible in one correction cycle and a deviation needs to be measured a plurality of number of times. For this reason, the registration marks 960C to 960K should be formed in a small size. It is not desirable to avoid the stated problem by forming the registration marks 960C to 960K in a large size.

SUMMARY OF THE INVENTION

The object of the present invention is to provide an adjustment mechanism in an image forming apparatus which forms toner patterns and includes a correction mechanism for correcting image forming positions in accordance with results obtained by the optical sensor that reliably detects the toner patterns by means of the adjustment mechanism.

The object of the present invention can be achieved by an image forming apparatus which corrects a condition for an image formation in accordance with a detection result of a toner pattern formed on a transfer medium transported in a first direction, the image forming apparatus made up of: a specific pattern forming unit for forming at least one specific pattern on the transfer medium; a detecting unit, which is located at a downstream side of the specific pattern forming unit in the first direction, for detecting the specific pattern formed on the transfer medium; a deviation obtaining unit for obtaining a deviation in a second direction between a detecting position on the transfer medium and a predetermined point of the toner pattern to be formed on the transfer medium in accordance with a detection result given by the detecting unit, the second direction intersecting the first direction and the detecting position being a position where the detecting unit detects the toner pattern; and an adjusting unit for adjusting, in accordance with the deviation obtained by the deviation obtaining unit, a positional relation in the second direction between the detecting position and the predetermined point to reduce the deviation.

The object of the present invention can be also achieved by an image forming apparatus made up of: a photosensitive component; a registration mark forming unit for forming a registration mark on the photosensitive component; a specific pattern forming unit for forming a specific pattern on the photosensitive component; a transfer medium on which the registration mark and the specific pattern formed on the photosensitive component are transferred; a sensor for detecting the registration mark and the specific pattern transferred onto the transfer medium; and an adjusting unit for adjusting, in accordance with a detection result of the specific pattern given by the sensor, a positional relation between a detecting position on the transfer medium and a predetermined point of the registration mark to be formed on the transfer medium to reduce a deviation between the detecting position and the predetermined point, the detecting position being a position where the sensor detects the registration mark.

The object of the present invention can be also achieved by an adjusting method of a toner pattern detecting system for an image forming apparatus which corrects a condition for an image formation in accordance with a detection result given by a detecting unit that detects a toner pattern and a specific pattern formed by an image holding component on a transfer medium transported in a first direction, the adjusting method including: a deviation obtaining step for obtaining a deviation in a second direction between a detecting position on the transfer medium and a predetermined point of the toner pattern to be formed on the transfer medium in accordance with a detection result of the specific/pattern, the second direction intersecting the first direction and the detecting position being a position where the detecting unit detects the toner pattern; and an adjusting step for adjusting, in accordance with the deviation obtained in the deviation obtaining step, a positional relation in the second direction between the detecting position and the predetermined point to reduce the deviation.

The object of the present invention can be also achieved by an adjusting method of a registration mark detecting system for an image forming apparatus which forms a registration mark as a toner pattern on a transfer medium, the adjusting method including: a specific pattern forming step for forming a specific pattern as a toner image on the transfer medium; a specific pattern detecting step for detecting the specific pattern formed on the transfer medium using a sensor; and an adjusting step for adjusting, in accordance with a detection result obtained in the specific pattern detecting step, a positional relation between a detecting position on the transfer medium and a predetermined point of the registration mark to be formed on the transfer medium so as to reduce a deviation between the detecting position and the predetermined point, the detecting position being a position where the sensor detects the registration mark.

With these constructions, when the registration correction is performed, for example, a deviation in the main scanning direction between a detecting position of the detecting unit and forming positions of toner patterns (or, registration marks) can be minimized. Consequently, the detecting unit can reliably detect each valid width of the registration marks for the density detection, so that the registration correction can be correctly performed.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENTS

Figure 2:
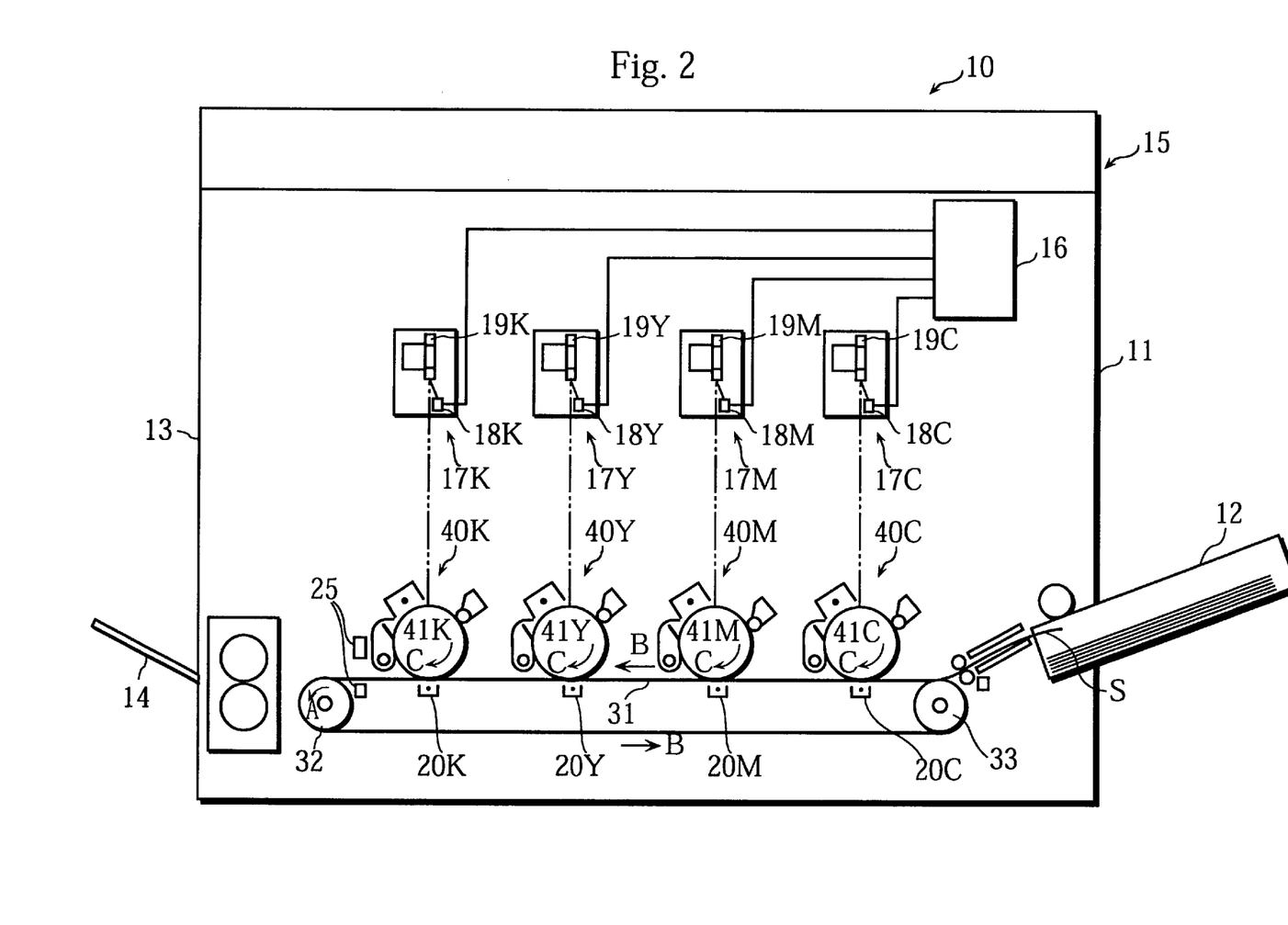
FIG. 2 is a schematic sectional view showing a construction of a tandem-type digital copying machine of embodiments of the present invention.

The following is a description of embodiments of the image forming apparatus of the present invention, with reference to the drawings. In these embodiments, a tandem-type digital full-color copying machine (simply referred to as the "copier" hereinafter) is used as an example of such image forming apparatus. FIG. 2 is a schematic view showing the construction of the copier of the present invention. Although the copier is used as an example in the embodiments, the present invention can be applied to various image forming apparatuses, such as a printer and a facsimile.

First Embodiment

In the copier, a paper feeding cassette 12 is set on a right-side wall 11 of an enclosure 10 and can be freely slid in and out of the copier. A paper discharging tray 14 is set on a left-side wall 13 and protrudes outward. A transfer belt 31 is horizontally set in a lower space between the paper feeding cassette 12 and the paper discharging tray 14. Image forming units 40C, 40M, 40Y, and 40K are set above the transfer belt 31 along its length. The transfer belt 31 transports a recording sheet S, and the image forming units 40C to 40K successively transfer toner images for each color onto the recording sheet S. The toner images are superimposed on the recording sheet S to form a full-color image.

An image reading unit 15 is set at the upper part of the enclosure 10. The image reading unit 15 optically reads an original document, so that image data of the original document is obtained. An image processing unit of a controlling unit 16 performs the necessary processes on this obtained image data and separates the image data into each color C, M, Y, and K. Laser diodes (referred to as the "LDs" hereinafter) 18C to 18K of optical units 17C to 17K set above the image forming units 40C to 40K are driven to perform light modulation in accordance with the image data for each color. Light-modulated laser beams are respectively deflected by polygon mirrors 19C to 19K in the main scanning direction and guided into the image forming units 40C to 40K corresponding to the respective colors.

The image forming units 40C to 40K respectively have photosensitive drums 41C to 41K as main components, chargers, and developing units. The light-modulated laser beams respectively expose the corresponding photosensitive drums 41C to 41K which are rotated in the direction of arrows C shown in FIG. 2. Electrostatic latent images formed by means of the exposure are developed into visible toner images by the corresponding developing units. The developing units respectively supply the photosensitive drums 41C to 41K with toners C, M, Y, and K as developers corresponding to the light-modulated colors of the optical units 17C to 17K.

Transfer chargers 20C to 20K are respectively set at positions located directly under the photosensitive drums 41C to 41K of the image forming units 40C to 40K, with the transfer belt 31 in between. The toner images formed on the surfaces of the photosensitive drums 41C to 41K are transferred onto the recording sheet S which is transported on the transfer belt 31. Here, the toner images are superimposed on the recording sheet S to form a color image. After the toner image transfer, the recording sheet S is transported by the transfer belt 31 to fixing rollers which fix the transferred toner image onto the recording sheet S. Finally, the recording sheet S is discharged onto the discharging tray 14.

A transmission type optical sensor 25 (referred to as the "optical sensor 25" hereinafter) is set after the photosensitive drums 41C to 41K in the transportation direction of the transfer belt 31. The optical sensor 25 is used for the registration correction and the adjustment operation for the registration correction described later in this specification. The transfer belt 31 of the present embodiment is made of transparent synthetic resin material, such as polyethylene terephthalate (PET). As such, the optical sensor 25 can detect a toner density of an image formed on the transfer belt 31. A reflection type optical sensor can be used as the optical sensor 25 if opaque material is used as the transfer belt 31 or if the registration marks are formed on the recording sheet S.

The optical sensor 25 includes a light-emitting diode (referred to as the "LED" hereinafter) and a photo diode (referred to as the "PD" hereinafter). Receiving a control signal from a CPU 101 described later and shown in FIG. 3, the optical sensor 25 has the LED emit a light which is then converged by a converging lens (not illustrated). This light exposes the surface of the transfer belt 31. The light passing through the transport belt 31 is received by the PD and converted into an electric signal. This detection signal is amplified by an amplifier. The amplified detection signal is further converted into a multivalued digital signal by an A/D converter and outputted to the CPU 101.

Figure 3:
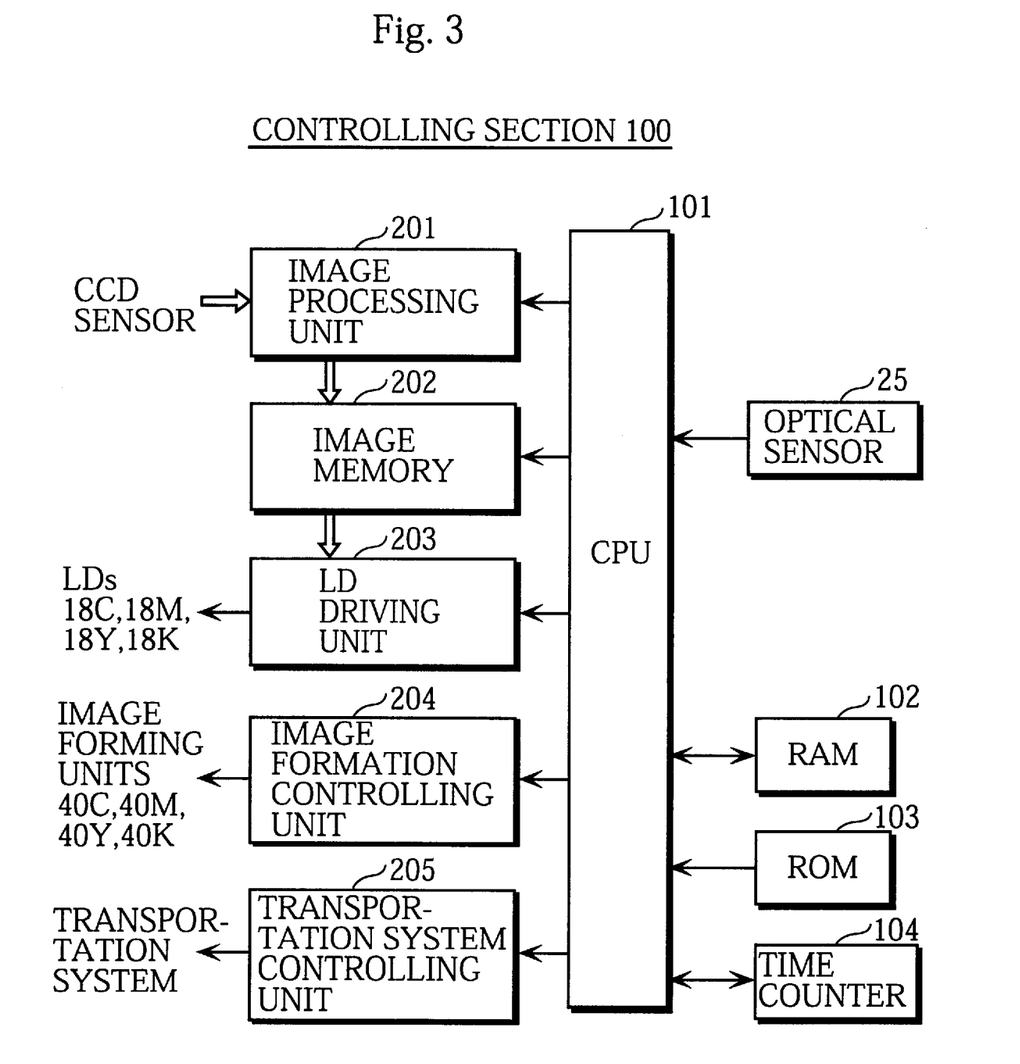
FIG. 3 is a block diagram showing the construction of a controlling section 100 of the first embodiment of the present invention, which performs the registration correction and the adjustment operation for the registration correction.

The following is a description of a controlling section which performs the registration correction and the adjustment operation for the registration correction. FIG. 3 is a block diagram showing the construction of a controlling section 100 which performs the registration correction and the adjustment operation for the registration correction. The controlling section 100 is part of the controlling unit 16 which controls the entire copier, and is composed of a CPU 101 for performing calculation processing, a RAM 102 for serving as a work area of the CPU 101, a ROM 103 for storing programs, and a time counter 104 for programmatically counting a time. The CPU 101 is connected to an image processing unit 201, an image memory 202, an LD driving unit 203, an image formation controlling unit 204, and a transportation system controlling unit 205 which are controlled by another CPU included in the controlling unit 16.

The image processing unit 201 converts the electric signals for red(R), green(G), and blue(B) obtained by scanning the original document into the multivalued digital signals to generate image data. After performing the well-known correction processing, such as a shading correction process, the image processing unit 201 generates C, M, Y, and K image data for each pixel and outputs the image data to the image memory 202, where the image data is stored for each reproduction color. In doing so, the image memory 202 stores the image data for each pixel in a storing position (or, an address) corresponding to a position of the pixel.

The LD driving unit 203 drives the LDs 18C to 18K in accordance with the image data. The image formation controlling unit 204 has the image forming units 40C to 40K perform the stated operation, so that the electrostatic latent images formed by means of the exposure of the LDs 18C to 18K are developed into the toner images. The toner images are then sequentially transferred onto the recording sheet S. The transportation system controlling unit 205 controls operations, such as the transportation of the recording sheet S by transfer belt driving rollers 32 and 33.

The ROM 103 stores programs which the CPU 101 reads to perform the registration correction and the adjustment operation for the registration correction, and also stores data required for printing a registration mark and a specific pattern used for the adjustment operation.

According to the programs stored in the ROM 103, the CPU 101 controls the registration correction and the adjustment operation for the registration correction. When performing the registration correction, the CPU 101 has the image memory 202 store the data for printing the registration mark that is stored in the ROM 103. Then, the CPU 101 gives instructions to the LD driving unit 203, the image formation controlling unit 204, and the transportation system controlling unit 205 so that the registration mark is formed on the transfer belt 31 for each color using the data stored in the image memory 202. Here, the registration marks are formed with a certain distance between them. Each of the registration marks, which is in the same shape as shown in FIG. 1B, is about 8 mm wide in the main scanning direction and its valid width for the density detection is about 4 mm. This V-shaped registration mark is composed of a standard line making a right angle with a transportation direction when no deviation is detected and a sloped line forming a 45° angle with the standard line.

Figure 6:
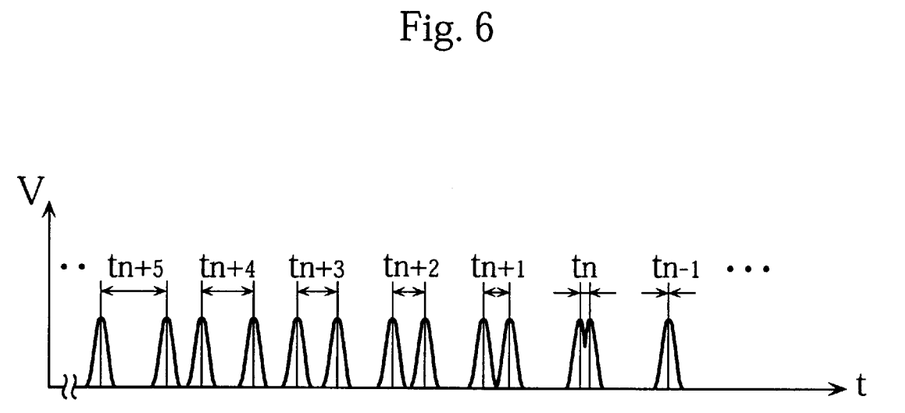
FIG. 6 shows an example of a detection signal obtained when the optical sensor 25 detects the specific patterns shown in FIG. 5.

As the transfer belt 31 moves, the standard and sloped lines of the registration marks formed on the transfer belt 31 approach the optical sensor 25. When one of the standard or sloped lines passes directly under the optical sensor 25, a waveform signal having a peak value as shown in FIG. 6 is detected. The detection signal is converted to a digital signal and outputted to the CPU 101. The time counter 104 counts each time period taken between the detections of the peak values.

In this way, the time period is measured between the detections of the peak values of the registration marks. If each time period measured between the detections of the standard lines differs from a predetermined time period, the CPU 101 corrects the deviation by correcting the addresses in the sub-scanning direction for each color stored in the image memory 202, with consideration given to the moving speed of the transfer belt 31. If the time period measured between the detections of the standard line and the sloped line varies with the registration marks, the CPU 101 sets the registration mark for K as the standard mark. Then, the CPU 101 corrects the deviation by correcting the addresses in the main scanning direction for the reproduction colors aside from black stored in the image memory 202 so that the registration marks for C, M, and Y are aligned with the registration mark for K. According to the above operations, the registration correction is achieved.

Figure 4:
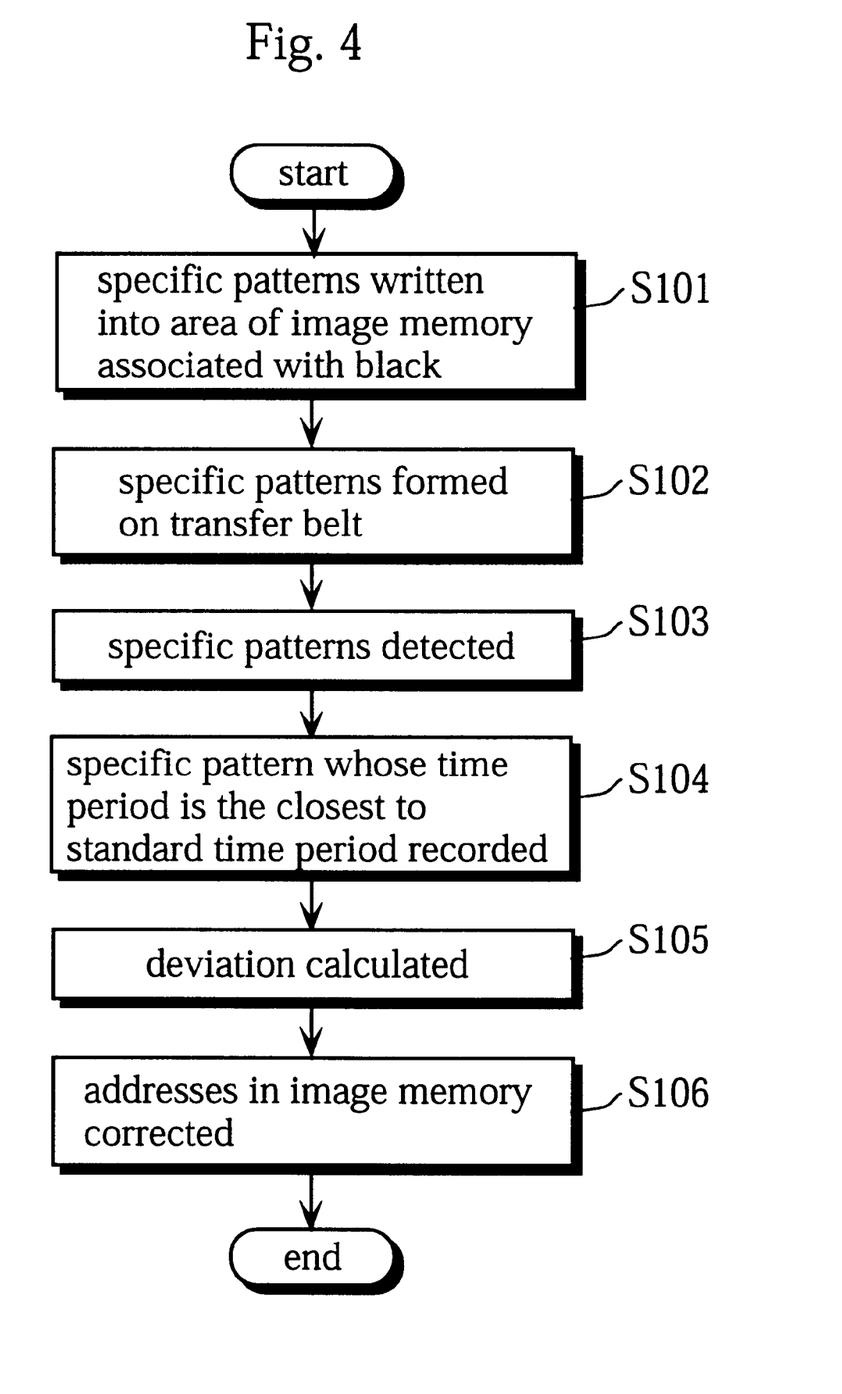
FIG. 4 is a flowchart showing the adjustment operation performed for the registration correction in the first embodiment of the present invention.

Next, the adjustment operation for the registration correction is explained. This adjustment operation is performed so that the registration marks used for the registration correction are formed within a valid detection range of the optical sensor 25. FIG. 4 is a flowchart of the adjustment operation. As a general rule, this operation is performed at the factory prior to shipment or when the copier is set up. However, the operation may be performed when necessary, such as every time an image formation is performed. The same can be said of the second embodiment.

The CPU 101 stores the data for printing specific patterns stored in the ROM 103 into an area of the image memory 202 associated with black which is used as the standard color (step S101 of FIG. 4). Each of the specific patterns is in the same shape as the registration mark and composed of a standard line and a sloped line.

Figure 5:
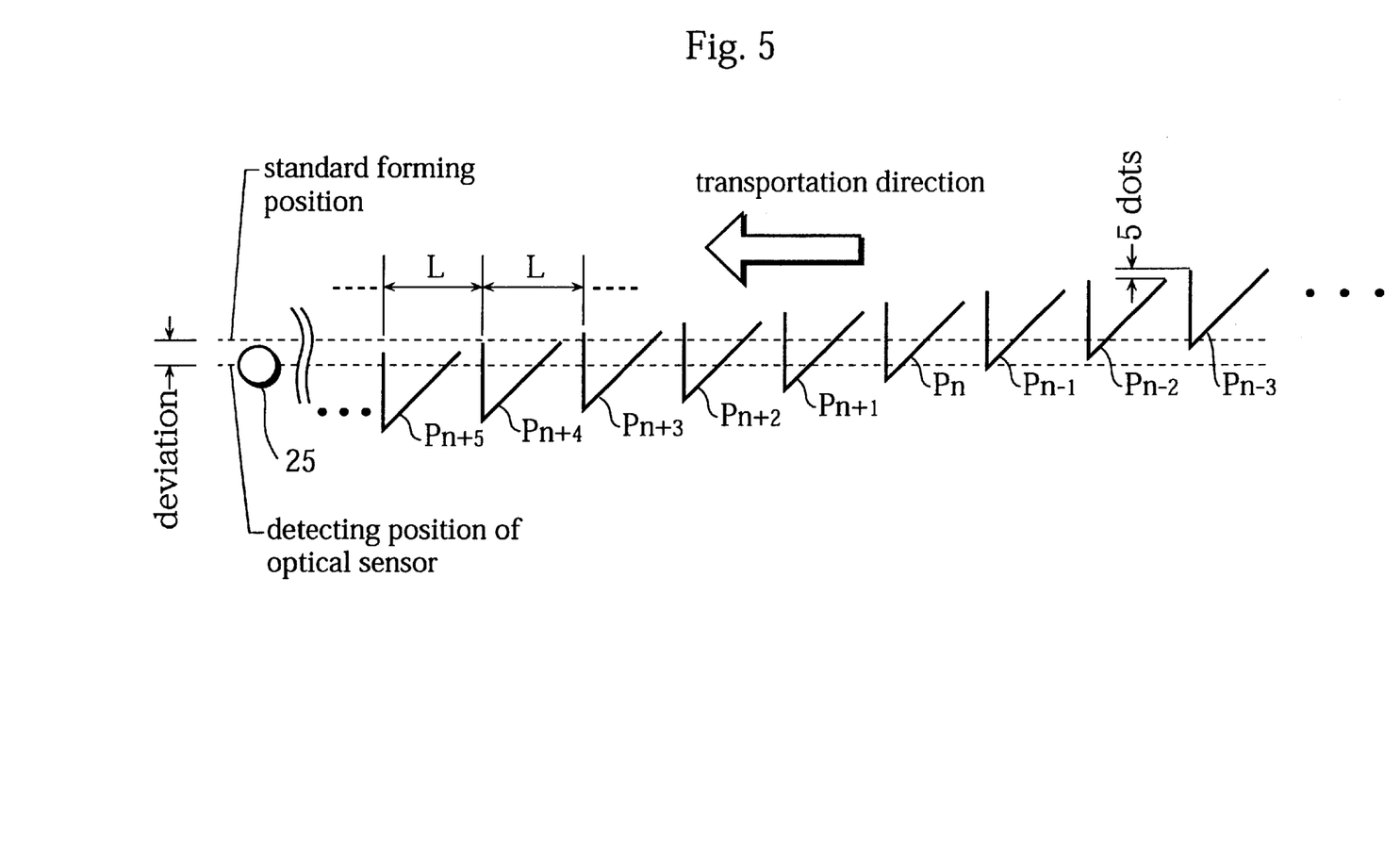
FIG. 5 is a plan view showing an example of specific patterns formed on the transfer belt in the first embodiment of the present invention.

The CPU 101 gives the instructions to the LD driving unit 203, the image formation controlling unit 204, and the transportation system controlling unit 205 so that the specific patterns stored in the image memory 202 are formed on the transfer belt 31 in the arrangement as shown in FIG. 5 (step S102). More specifically, forty-one of the specific patterns ( . . . Pn+5, Pn+4, Pn+3, Pn+2, Pn+1, Pn, Pn−1, Pn−2, Pn−3, . . . as shown in FIG. 5) are formed on the transfer belt 31 with the middle pattern Pn being formed at a standard forming position of the registration marks (simply referred to as the "standard forming position" hereinafter). The standard forming position is determined at the factory prior to shipment. Each of the specific patterns is deviated 5 dots with respect to the adjacent specific pattern(s) in the main scanning direction, and are formed with a certain distance L between them in the sub-scanning direction so that the specific patterns are not overlaid one another. As such, the specific patterns are formed in a range of ±100 dots in the main scanning direction, with the standard forming position being located at the middle in the main scanning direction. Note that the downward direction in FIG. 5 is a forward direction of the main scanning direction.

The specific patterns formed on the transfer belt 31 are sequentially detected by the optical sensor 25 and inputted to the CPU 101 (step S103). The CPU 101 measures the time period taken between the detections of the standard line and the sloped line for each of the specific patterns using the time counter 104.

More specifically, the detection waveforms as shown in FIG. 6 are outputted from the optical sensor 25 and inputted to the CPU 101 after the A/D conversion. From these detection signals, the CPU 101 obtains the central position (or, peak position) of each detection value as a standard position using a barycenter calculating method. This standard position is determined as a correct position of the standard or sloped line of the corresponding specific pattern. The CPU 101 then measures a time period taken between the detections of the standard line and the sloped line for each of the specific patterns ( . . . tn+5, tn+4, tn+3, tn+2, tn+1, tn, tn−1, . . . as shown in FIG. 6). It should be noted here that the standard line or the sloped line may not be detected due to the forming position of the specific pattern in the main scanning direction. Since a distance between the photosensitive drum 41K and the optical sensor 25, the moving speed of the transfer belt 31, and a time when each of the specific patterns is formed are apparent, the CPU 101 can identify the specific pattern by the time when the standard line of the specific pattern is detected by the optical sensor 25.

The moving speed of the transfer belt 31 and the shape of the specific patterns are apparent. Therefore, the time period taken between the detections of the standard line and the sloped line can be obtained beforehand, with the optical sensor 25 detecting the respective middle points of the standard and sloped lines in the main scanning direction. The CPU 101 sets this time period as the standard time period and compares the time period actually taken between the detections of the standard line and the sloped line of each specific pattern detected by the optical sensor 25 with the standard time period. Then, the CPU 101 records the specific pattern whose time period is the closest to the standard time period (step S104).

The CPU 101 obtains a deviation of the recorded specific pattern from the specific pattern formed at the standard forming position. From this deviation, the CPU 101 obtains the deviation of the detecting position of the optical sensor 25 from the standard forming position in the main scanning direction (step S105). As one example, suppose that the time period of the specific pattern Pn+3 shown in FIG. 5 is the closest to the standard time period. The specific pattern Pn+3 is situated three patterns ahead of the specific pattern Pn formed at the standard forming position in the transportation direction. As described above, each of the specific patterns is deviated 5 dots with respect to the adjacent specific pattern(s) in the main scanning direction. Therefore, the deviation of the specific pattern Pn+3 from the specific pattern Pn in the forward direction is calculated at 15 (=5×3) dots. This is to say, when a specific pattern is situated k specific patterns ahead of or behind the specific pattern Pn in the transportation direction, the specific pattern is deviated by ±5×k dots from the specific pattern Pn in the forward direction.

After the calculation of the deviation, the CPU 101 adjusts the forming positions of the registration marks by correcting the addresses in the image memory 202 in accordance with the calculated deviation. When doing so, the CPU 101 corrects the addresses corresponding to all of the reproduction colors in accordance with the calculated deviation (step S106). The deviation among the forming positions of the registration marks on the photosensitive drums 41C to 41K are not so great. For this reason, the forming positions of the registration marks on the photosensitive drums 41C to 41Y can be correctly adjusted in accordance with the deviation of the forming position of the photosensitive drum 41K from the standard forming position. It should be obvious that each deviation of the forming positions of the photosensitive drums 41C to 41Y may be also calculated in the same way and the addresses in the image memory 202 may be corrected for each color in accordance with the calculated deviation.

The adjustment operation for the registration correction is performed as stated above. Consequently, the optical sensor 25 can reliably detect each valid width of the registration marks for the density detection when the registration correction is performed for image formation.

Figure 7:
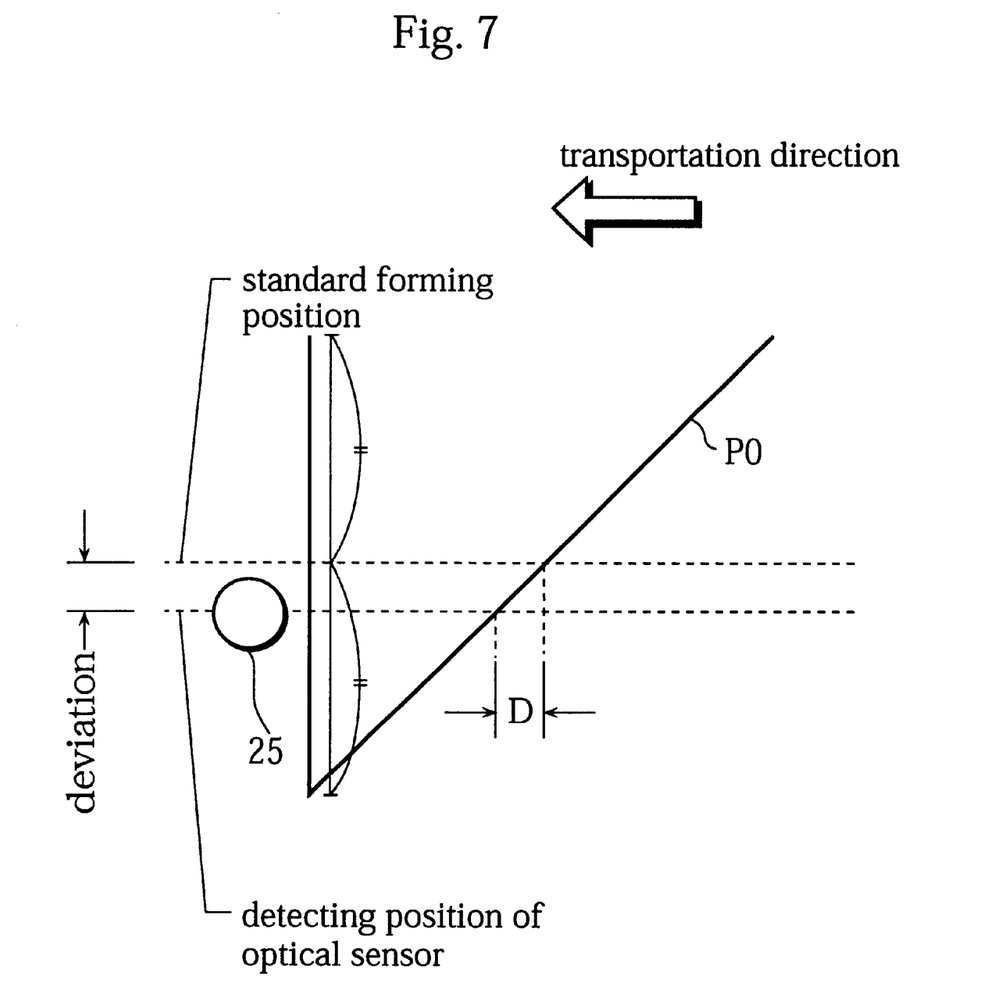
FIG. 7 shows the specific pattern of the first embodiment of the present invention.

In the present embodiment, the optical sensor 25 detects the specific patterns which are deviated with respect to one another. However, only one specific pattern P0 may be formed as shown in FIG. 7. The specific pattern P0 is composed of a standard line having a width of ±100 dots in the main scanning direction and a sloped line forming a 45° angle with the standard line. As shown in FIG. 7, the middle of the specific pattern P0 in the main scanning direction is located at the standard forming position.

The deviation of the detecting position of the optical sensor 25 from the standard forming position in the main scanning direction is obtained using the specific pattern P0 as follows. First, a time period taken between the detections of the standard line and the sloped line of the specific pattern P0 is measured using the optical sensor 25 in the stated way. The shape of the specific pattern P0 and the moving speed of the transfer belt 31 are apparent. Therefore, the time period taken between the detections of the standard line and the sloped line in a case when there is no deviation of the detecting position of the optical sensor 25 from the standard forming position in the main scanning direction can be obtained beforehand. The CPU 101 sets this time period taken when there is no deviation as the standard time period, and calculates a difference between the standard time period and an actually measured time period.

Suppose that this time difference is "T0" and the moving speed of the transfer belt 31 is "V0". By calculating an equation V0×T0, a distance "D" is obtained. The distance D indicates a distance in the sub-scanning direction between the sloped line actually detected by the optical sensor 25 and the sloped line detected by the optical sensor 25 in a case when there is no deviation of the detecting position of the optical sensor 25 from the standard forming position in the main scanning direction. Here, the sloped line forms a 45° angle with the standard line. Therefore, the distance D is equivalent to the deviation of the detecting position of the optical sensor 25 from the standard forming position in the main scanning direction.

The deviation obtained in this way is converted into the number of dots. Then, the addresses in the image memory 202 in the main scanning direction are corrected according to the number of dots. Accordingly, the adjustment operation can be performed for the registration correction.

Second Embodiment

Figure 8:
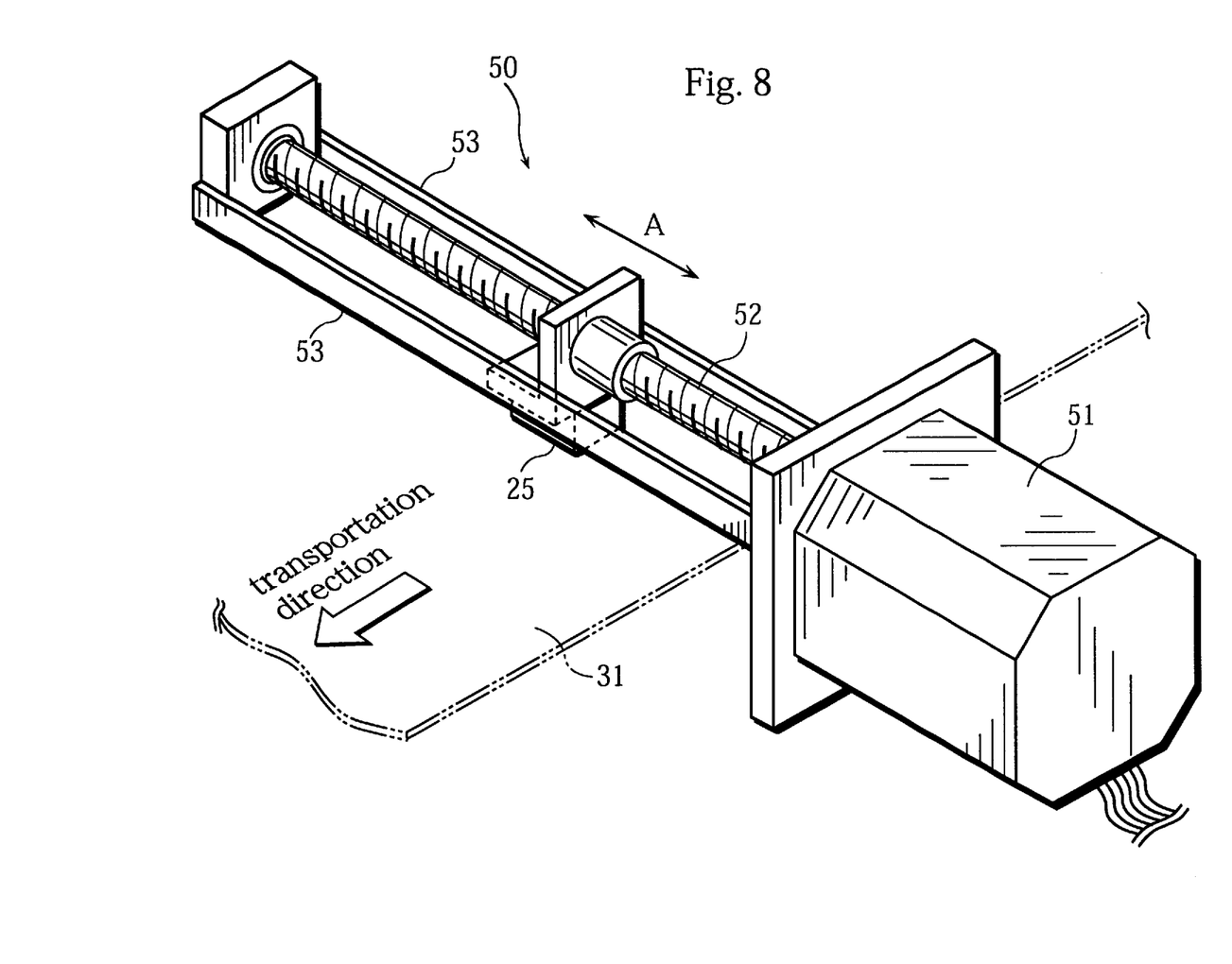
FIG. 8 is a perspective view showing a driving mechanism of the optical sensor 25 used in the second embodiment of the present invention.

In the second embodiment, an image forming apparatus basically has the same construction as the image forming apparatus of the first embodiment shown in FIG. 2. However, the image forming apparatus of the second embodiment differs from the image forming apparatus of the first embodiment in that a reflection type optical sensor is used as the optical sensor 25. As shown in FIG. 8, this optical sensor 25 is set to be freely shifted in the direction of the arrow A (i.e., in the main scanning direction) by a driving mechanism 50 which is composed of a stepping motor 51, a ball screw 52, and a guide 53. The driving mechanism 50 is driven by a sensor motor driving unit (not illustrated).

Figure 9:
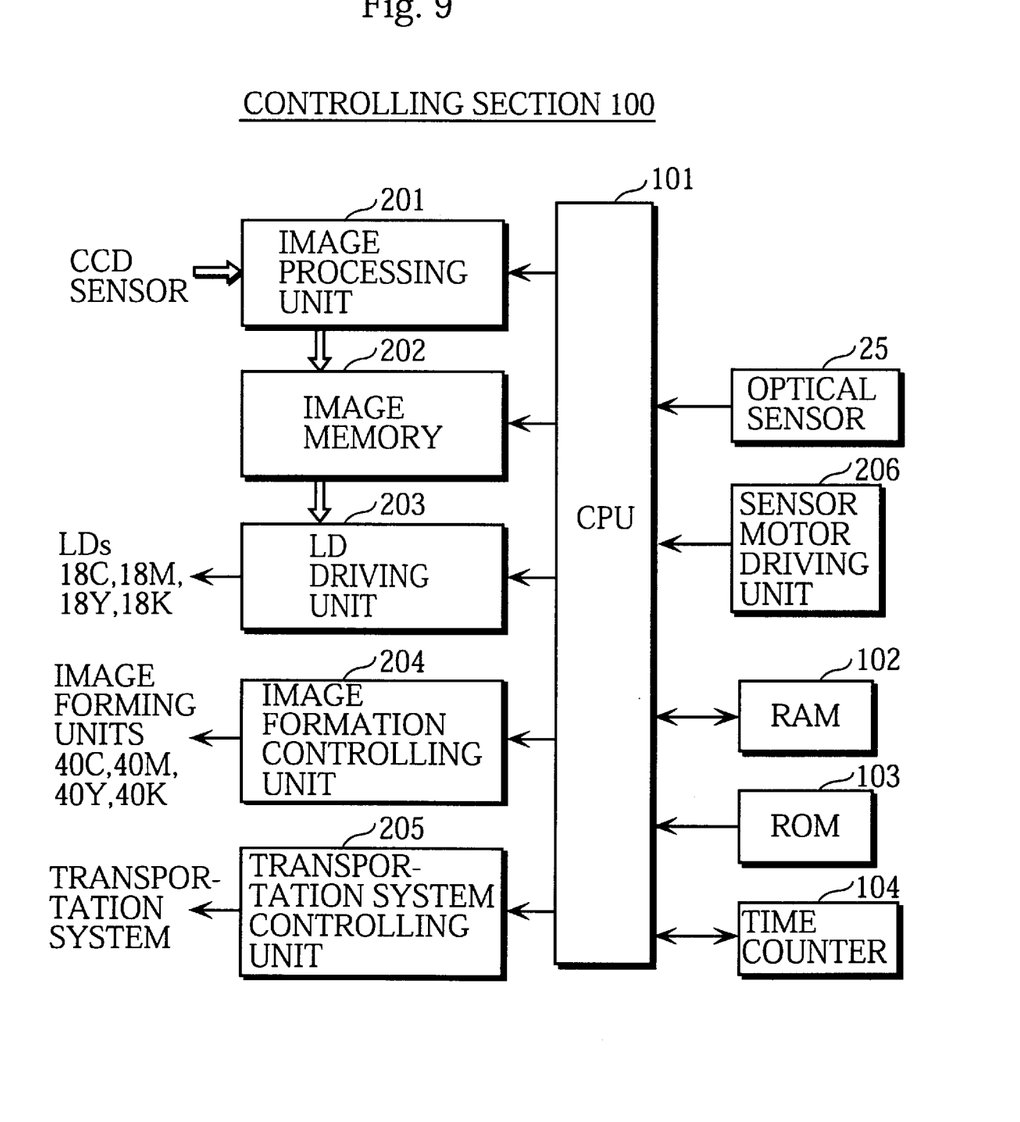
FIG. 9 is a block diagram showing the construction of the controlling section 100 of the second embodiment of the present invention, which performs the registration correction and the adjustment operation for the registration correction.

Due to the addition of the driving mechanism 50 to the construction, the controlling section 100 controls a sensor motor driving unit 206 which drives a motor of the driving mechanism 50. As such, the ROM 103 stores control programs that are not included in the first embodiment.

Figure 10:
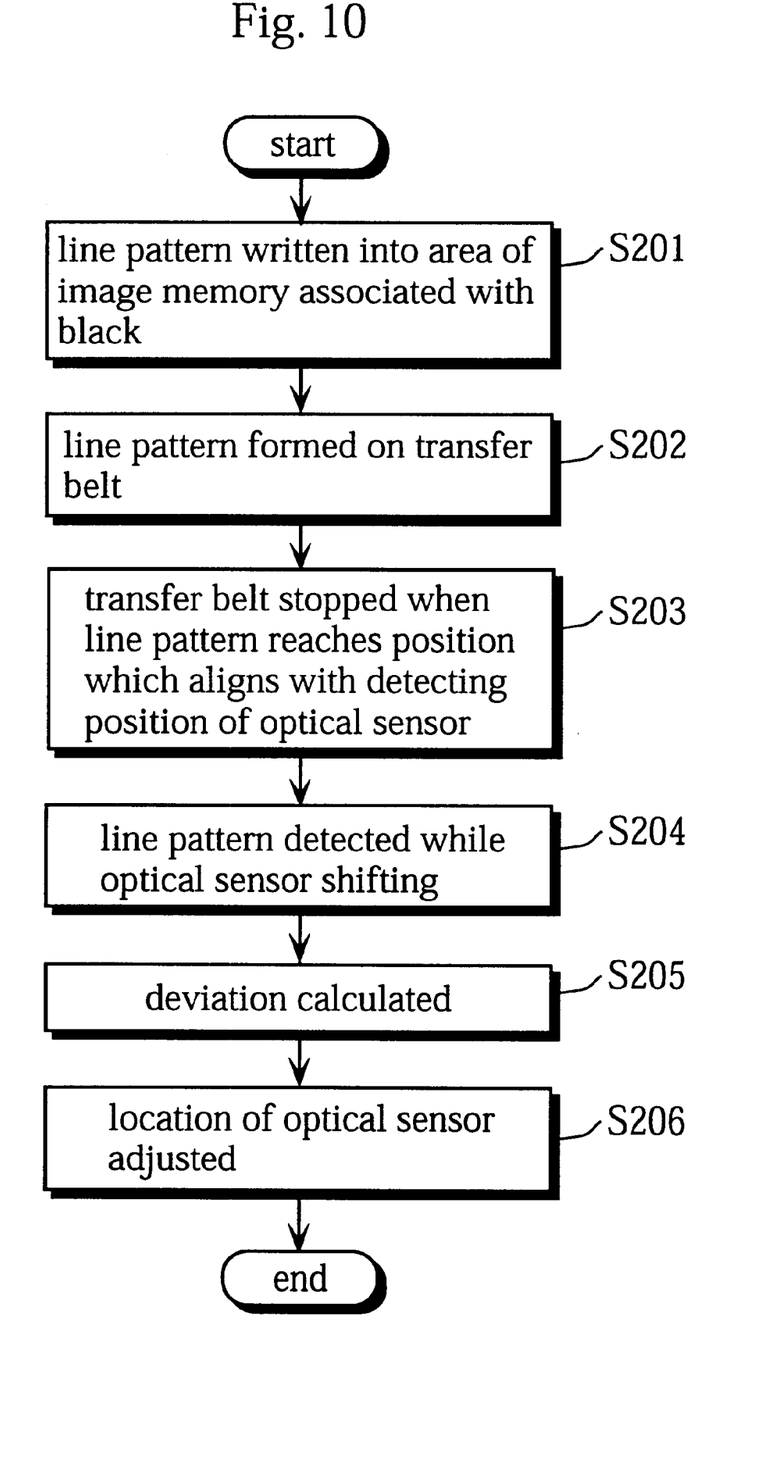
FIG. 10 is a flowchart showing the adjustment operation performed for the registration correction in the second embodiment of the present invention.

The following is a description of the adjustment operation for the registration correction performed by the image forming apparatus having the stated construction. FIG. 10 is a flowchart of the adjustment operation. Note that, in the initial state, the optical sensor 25 is located at its home position which is located at the end of a shift range of the optical sensor 25.

Figure 11:
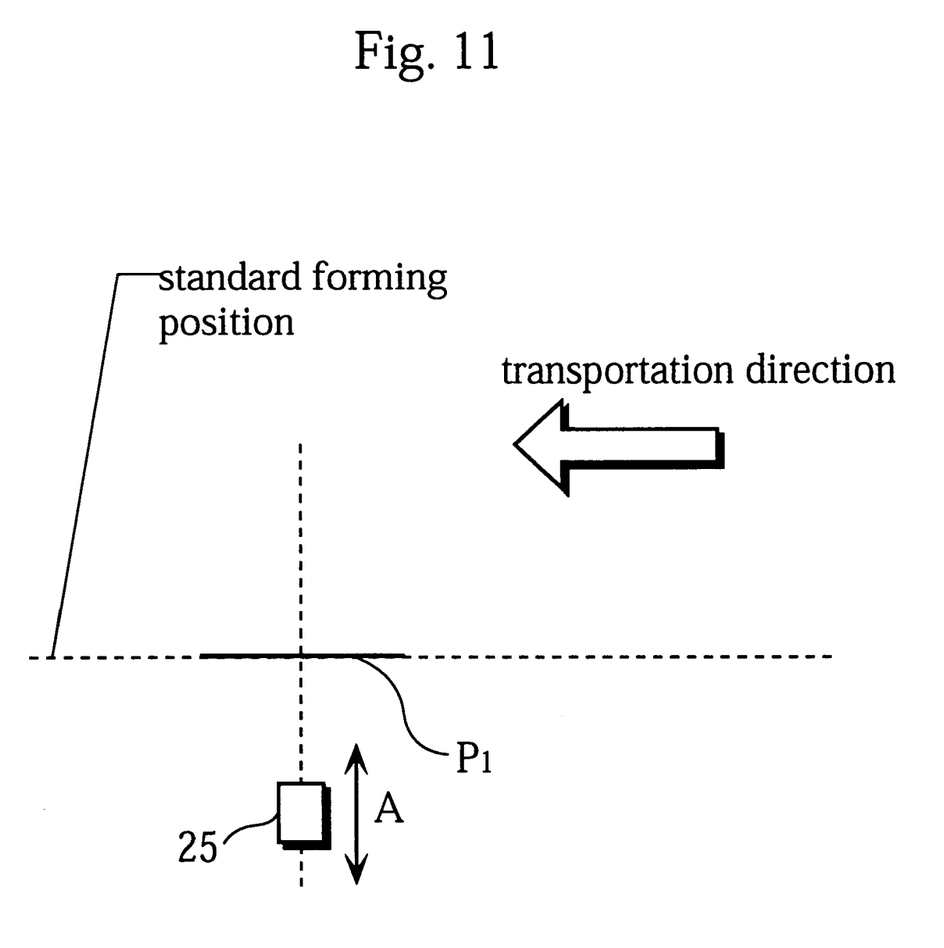
FIG. 11 is a plan view showing that a line image reaches a position which aligns with a detecting position of the optical sensor on a main scanning line in the second embodiment of the present invention.

The CPU 101 stores a line image having a predetermined length in the sub-scanning direction in the area of the image memory 202 associated with black (step S201). The line image is formed on the transfer belt 31 (step S202). Here, the middle of the line image in the main scanning direction is located at the standard forming position which is set at the factory prior to shipment. Then, the CPU 101 controls the transfer belt 31 to stop when the middle point of the line image P1 in the sub-scanning direction reaches a position that is aligned with the detecting position of the optical sensor 25 on a main scanning line as shown in FIG. 11 (step S203).

Figure 12:
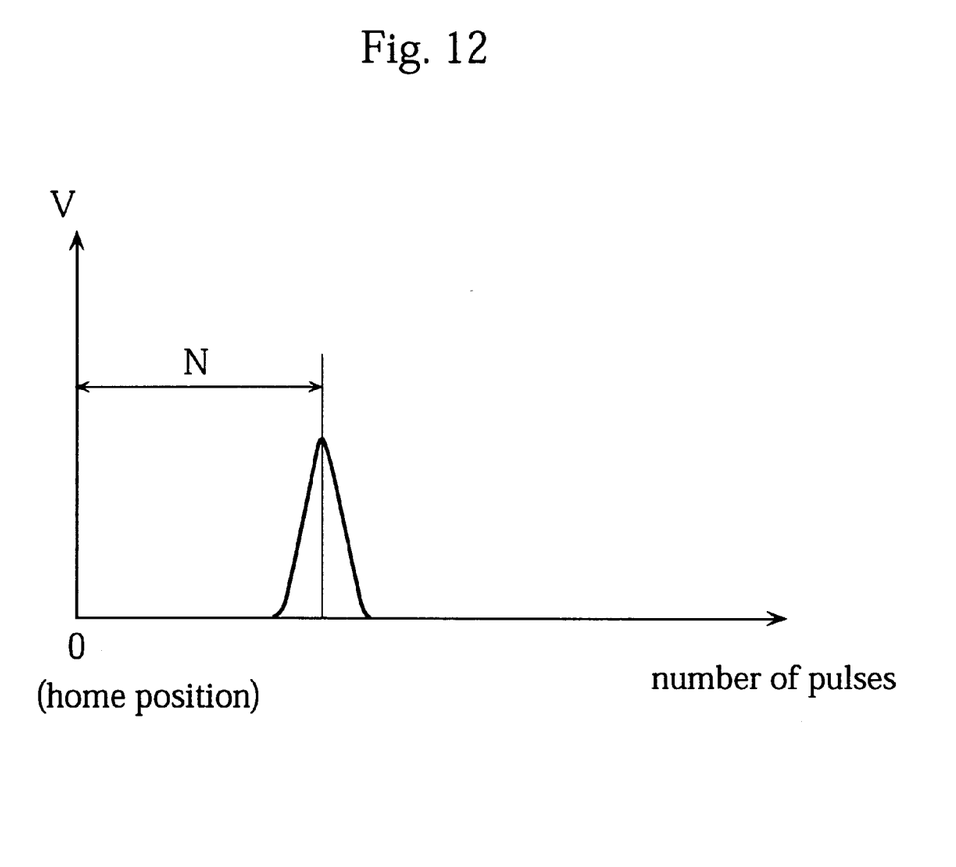
FIG. 12 is an example of a detection signal obtained when the optical sensor 25 detects the line image shown in FIG. 11.

After this, the CPU 101 gives an instruction to the sensor motor driving unit 206 to drive the driving mechanism 50 of the optical sensor 25. The CPU 101 then has the optical sensor 25 shift within the shift range, so that the toner density on the transfer belt 31 is detected (step S204). In doing so, the CPU 101 counts driving pulses of the stepping motor 51 of the driving mechanism 50, and as a result, a signal as shown in FIG. 12 is outputted from the optical sensor 25. From this signal, the CPU 101 obtains the central position (or, peak position) of the detection value as a standard position using the barycenter calculating method. Then, the CPU 101 obtains the number of pulses N that were counted before the optical sensor 25 detected the toner density of the image formed at the standard position (step S205). This number of pulses N is equivalent to the deviation of the home position of the optical sensor 25 from the standard forming position.

The CPU 101 has the optical sensor 25 return to the home position, and has the stepping motor 51 driven by the number of pulses N so that the location of the optical sensor 25 is correctly adjusted (step S206). Accordingly, the optical sensor 25 is located at the correct position, with no deviation from the standard forming position in the main scanning direction, thereby reliably detecting each valid width of the registration marks.

In the second embodiment, the location of the optical sensor 25 is corrected to eliminate the deviation after the deviation is calculated. However, as in the case of the first embodiment, after the deviation is calculated and the optical sensor 25 returns to the home position, the addresses in the image memory 202 may be modified so that the image forming positions are corrected.

In the stated embodiments, the registration marks are transferred onto the transfer belt 31 and the optical sensor 25 detects these registration marks. However, patterns formed on the transfer belt 31 are not limited to the registration marks and may be different patterns as long as the image forming apparatus forms toner patterns and includes a mechanism which detects the toner patterns using an optical sensor.

In the stated embodiments, the present invention has been described for the copier as an example, and in particular, a tandem-type color copier has been described. However, the present invention is not limited to the tandem-type image forming apparatus, and can be applied to a monochrome image forming apparatus or a color image forming apparatus which forms multicolor images using a single photosensitive drum.

The present invention is not limited to the image forming apparatus in which toner images formed on the photosensitive drums are transferred directly onto a recording sheet. The present invention can be applied to image forming apparatuses which have transfer intermediate components of various types and employ the intermediate transfer method.

Although the present invention has been fully described by way of examples with reference to the accompanying drawings, it is to be noted that various changes and modifications will be apparent to those skilled in the art.

Therefore, unless such changes and modifications depart from the scope of the present invention, they should be constructed as being included therein.

What is claimed is:

1. An image forming apparatus comprising:

a transfer medium which is moved in a first direction;

a plurality of image forming units for forming an image respectively and for transferring the image onto the transfer medium or a recording sheet thereon, each image forming unit being capable of forming and transferring a registration mark onto the transfer medium, and at least one image forming unit being capable of forming at least one specific pattern on the transfer medium for adjustment of a registration mark detecting position;

a detector for detecting the registration mark and the specific pattern, and for providing a detection signal thereof; and a controller for, based on the detection signal of the registration mark, correcting a deviation between positions at which images are transferred by the plurality of image forming units, the controller, based on the detection signal of the specific pattern, obtaining an amount of deviation in a second direction between a reference detecting position at which the detector should detect the registration mark and an actual detecting position at which the detector detects the registration mark, and adjusting relative positions of the detector and the registration mark based on the thus obtained amount of deviation, wherein the second direction is perpendicular to the first direction.

2. The image forming apparatus of claim 1, wherein the at least one image forming unit forms a plurality of specific patterns, a middle specific pattern of the plurality of specific patterns is formed at a reference forming position of the registration mark, and each specific pattern of the plurality of specific patterns is formed with a space between each specific pattern in the first direction, and with a predetermined amount of deviation in the second direction, with respect to an adjacent specific pattern.

3. The image forming apparatus of claim 2, wherein each specific pattern is composed of a standard line parallel to the second direction and a sloped line forming a predetermined angle with the standard line.

4. The image forming apparatus of claim 1, wherein the at least one image forming unit forms one specific pattern composed of a standard line parallel to the second direction and a sloped line forming a predetermined angle with the standard line.

5. The image forming apparatus of claim 1, wherein the controller adjusts the relative positions of the detector and the registration mark by shifting a forming position of the registration mark.

6. The image forming apparatus of claim 1, further comprising a driving mechanism for driving the detector to move along the second direction, wherein the at least one specific pattern comprises one specific pattern composed of a line image having a predetermined length in the first direction, and the controller controls the driving mechanism to move the detector so as to detect the specific pattern, and adjusts the relative positions of the detector and the registration mark by locating the detector to a position where the specific pattern has been detected based on the detection signal of the specific pattern.

7. A method for adjusting a detecting position of a detector with respect to a registration mark in an image forming apparatus including a transfer medium which is moved in a first direction, a plurality of image forming units for forming an image respectively and for transferring the image onto the transfer medium or a recording sheet thereon, each of which is capable of forming and transferring the registration mark onto the transfer medium for correction of a deviation between positions at which images are transferred by the plurality of image forming units, at least one image forming unit being capable of forming at least one specific pattern on the transfer medium for adjustment of the detecting position, and a detector for detecting the registration mark and the specific pattern and for providing a detection signal thereof, said method comprising the steps of:

1) receiving a detection signal of the specific pattern from the detector;

2) obtaining an amount of the deviation in a second direction between a reference detecting position at which the detector should detect the registration mark and an actual detecting position at which the detector detects the registration mark based on the detection signal of the specific pattern, wherein the second direction is perpendicular to the first direction; and 3) adjusting relative positions of the detector and the registration mark based on the amount of deviation obtained at the step 2).

8. The method of claim 7, wherein the at least one image forming unit forms a plurality of specific patterns, a middle specific pattern of the plurality of specific patterns is formed at a reference forming position of the registration mark, and each specific pattern of the plurality of specific patterns is formed with a space between each specific pattern in the first direction, and with a predetermined amount of deviation in the second direction, with respect to an adjacent specific pattern.

9. The method of claim 8, wherein each specific pattern is composed of a standard line. parallel to the second direction and a sloped line forming a predetermined angle with the standard line.

10. The method of claim 7, wherein the at least one image forming unit forms one specific pattern composed of a standard line parallel to the second direction and a sloped line forming a predetermined angle with the standard line.

11. The method of claim 7, wherein the relative positions of the detector and the registration mark are adjusted by shifting a forming position of the registration mark at the step 3).

12. The method of claim 7, wherein the at least one specific pattern comprises one specific pattern composed of a line image having a predetermined length in the first direction, the step 1) further includes a step of moving the detector along the second direction to detect the specific pattern, and at the step 3) the relative positions of the detector and the registration mark are adjusted by locating the detector to a position where the specific pattern has been detected based on the detection signal of the specific pattern.

* * * * *